United States Patent [19]

Pasquini et al.

[11] Patent Number: 4,864,498
[45] Date of Patent: Sep. 5, 1989

[54] STIR PROMPT APPARATUS

[75] Inventors: Mario Pasquini, Milford; Kathie A. Breen, Oxford, both of Conn.

[73] Assignee: Food Automation-Service Techniques, Inc., Stratford, Conn.

[21] Appl. No.: 137,519

[22] Filed: Dec. 23, 1987

Related U.S. Application Data

[63] Continuation-in-part of Ser. No. 34,055, Apr. 2, 1987, abandoned.

[51] Int. Cl.$^4$ .............................................. G06F 15/20
[52] U.S. Cl. ...................................... 364/400; 99/348
[58] Field of Search .................. 364/400; 99/325, 327, 99/348; 219/494, 442, 492

[56] References Cited

U.S. PATENT DOCUMENTS

| | | | |
|---|---|---|---|
| 4,036,949 | 1/1982 | Longabaugh | 364/400 |
| 4,503,502 | 3/1985 | Chapin | 99/348 |
| 4,688,475 | 8/1987 | Witt et al. | 304/400 |
| 4,740,888 | 4/1988 | Ceste, Sr. et al. | 364/400 |
| 4,742,455 | 3/1988 | Schreyer | 364/400 |

Primary Examiner—Jerry Smith
Assistant Examiner—Kim Thanh Tbui
Attorney, Agent, or Firm—Felfe & Lynch

[57] ABSTRACT

Apparatus for prompting an operator to stir a cooking medium in a cooking appliance, for example, shortening in a fryer vat. The apparatus prompts the operator to stir the shortening vigorously during a cold start. The apparatus may utilize a timer which counts down the time and at time out causes a stir alarm to sound and a message to be displayed to alert the operator that a stir time has occurred. Also, the shortening temperature may be checked to determine whether a specific stir temperature has been reached. When a stir temperature has been reached, the alarm may be sounded and the meassage displayed to prompt the operator to stir the shortening.

19 Claims, 12 Drawing Sheets

STIR PROMPT APPARATUS

This application is a continuation-in-part of our co-pending application Ser. No. 034,055, filed Apr. 2, 1987 and now abandoned.

This invention relates to apparatus for prompting an operator to stir a cooking medium in a cooking appliance and, more particularly, to such apparatus which is useful in connection with commercial fryers which are customarily used in fast food restaurants where solid shortening may be used and the heating elements are not evenly distributed throughout the shortening in the fryer.

Due to the uneven distribution of heating elements, shortening can remain solid. Pieces of solid shortening which detach can alter the ability of the fryer to control the temperature reliably. This can result in an improperly cooked product, thereby affecting quality. This problem occurs most often in electric fryers, although it also can occur in, for example, gas fryers. The procedure for eliminating this problem is to stir the shortening vigorously during a cold start-up.

Our invention is directed to apparatus which prompts the operator to stir the shortening and can insure that the stirring is done at the appropriate time.

It is an object of the present invention, therefore, to provide a new and improved apparatus for prompting an operator to stir a cooking medium in a cooking appliance which avoids one or more of the disadvantages of prior cooking apparatus.

It is another object of the invention to provide a new and improved apparatus for prompting an operator to stir a cooking medium in a cooking appliance during a cold start-up of the cooking appliance.

It is another object of the invention to provide a new and improved apparatus for prompting an operator to stir a cooking medium in a cooking appliance for a predetermined number of times.

It is another object of the invention to provide a new and improved apparatus for prompting an operator to stir a cooking medium in a cooking appliance in which the prompting can be canceled.

It is another object of the invention to provide a new and improved apparatus for prompting an operator to stir a cooking medium in a cooking appliance in which the difference in temperature between a plurality of temperature probes at different locations in the cooking medium is used to prompt the operator.

In accordance with the invention, apparatus for prompting an operator to stir a cooking medium in a cooking appliance comprises means for determining whether the temperature of a cooking medium is below a predetermined value below which it is desired to prompt an operator to stir the cooking medium. The apparatus also includes register means responsive to the temperature-determining means when the temperature of the cooking medium is below the predetermined value for determining the number of times stirring is to be performed. The apparatus also includes timer means responsive to the temperature-determining means for determining a predetermined time interval between stir prompt signals to be initialized. The apparatus also includes means responsive to the register means for determining whether the number of times stirring is to be performed equals zero. The apparatus also includes decrementing means responsive to the timer means for decrementing the register means when the timer means has timed the predetermined time interval and stirring is to be performed. The apparatus also includes means responsive to the decrementing means for initializing a stir prompt signal to an operator to stir the cooking medium. The apparatus also includes means responsive to the initializing means for rendering a stir prompt signal. The apparatus also includes means for initializing a cancellation of the stir prompt signal when actuated. The apparatus also includes means responsive to the cancellation-initializing means for determining whether the cancellation-initializing means has been actuated. The apparatus also includes means responsive to the actuation of the cancellation-initializing means for canceling the stir prompt signal.

Also in accordance with the invention, apparatus for prompting an operator to stir a cooking medium in a cooking appliance comprises means for determining whether the temperature of a cooking medium is below a predetermined value below which it is desired to prompt an operator to stir the cooking medium. The apparatus also includes register means responsive to the temperature-determining means when the temperature of the cooking medium is below the predetermined value for determining the number of times stirring is to be performed. The apparatus also includes first timer means responsive to the temperature-determining means for determining a predetermined time interval between stir prompt signals to be initialized. The apparatus also includes means responsive to the register means for determining whether the number of times stirring is to be performed equals zero. The apparatus also includes decrementing means responsive to the first timer means for decrementing the register means when the timer means has timed the predetermined time interval and stirring is to be performed. The apparatus also includes second timer means and means responsive to the decrementing means for initializing a stir prompt signal to an operator to stir the cooking medium and for starting the second timer means. The apparatus also includes means responsive to the second timer means after a second predetermined time interval for canceling the stir prompt signal.

Also in accordance with the invention, apparatus for prompting an operator to stir a cooking medium in a cooking appliance comprises means for determining whether the temperature of a cooking medium is below a predetermined value below which it is desired to prompt an operator to stir the cooking medium. The apparatus also includes register means for storing a number of selected values of stir prompt temperature. The apparatus also includes means responsive to the temperature-determining means for selecting a first stir prompt temperature from the register means. The apparatus also includes means for determining the present temperature of the cooking medium. The apparatus also includes means responsive to the present temperature of the cooking medium for determining whether the present temperature equals the selected first stir prompt temperature. The apparatus also includes means responsive to the equal temperature-determining means for decrementing the number of selected stir prompt temperature values of the register means if the present temperature does not equal the selected first stir prompt temperature. The apparatus also includes means responsive to the decrementing means for determining whether the number of selected temperature values remaining after each decrementing is zero. The apparatus also includes means responsive to a remaining number other than zero of selected temperature values for selecting a second stir prompt temperature from the register means.

Also in accordance with the invention, apparatus for prompting an operator to stir a cooking medium in a cooking appliance comprises means for determining whether the temperature of a cooking medium is below a predetermined value below which it is desired to prompt an operator to stir the cooking medium. The apparatus also includes register means for storing a number of selected values of stir prompt temperatures. The apparatus also includes means responsive to the temperature-determining means for selecting a first stir prompt temperature from the register means. The apparatus also includes means for determining the present temperature of the cooking medium. The apparatus also includes means responsive to the present temperature of the cooking medium for determining whether the present temperature equals the selected first stir prompt temperature. The apparatus also includes means responsive to the equal-temperature determining means for determining whether the present temperature has been reached previously if the present temperature equals the selected first stir prompt temperature. The apparatus also includes means responsive to the present temperature having been reached previously for decrementing the number of selected stir prompt temperature values of the register means. The apparatus also includes means responsive to the decrementing means for determining whether the number of selected temperature values remaining after each decrementing is zero. The apparatus also includes means responsive to a remaining number other than zero of selected temperature values for selecting a second stir prompt temperature from the register means.

Also in accordance with the invention, apparatus for prompting an operator to stir a cooking medium in a cooking appliance comprises means for determining whether the temperature of a cooking medium is below a predetermined value below which it is desired to prompt an operator to stir the cooking medium. The apparatus also comprises register means responsive to the temperature-determining means when the temperature of the cooking medium is below the predetermined value for determining the number of times stirring is to be performed. The apparatus also includes first timer means responsive to the temperature-determining means for determining a predetermined time interval between stir prompt signals to be initialized. The apparatus also includes means responsive to the register means for determining whether the number of times stirring is to be performed equals zero. The apparatus also includes decrementing means responsive to the first timer means for decrementing the register means when the timer means has timed the predetermined time interval and stirring is to be performed. The apparatus also includes second timer means and means responsive to the decrementing means for initializing a stir prompt signal to an operator to stir the cooking medium and for starting the second timer means. The apparatus also includes means responsive to the initializing means for rendering a stir prompt signal. The apparatus also includes means responsive to the second timer means for determining whether the temperature differential of the cooking medium at different locations in the cooking medium is less than a predetermined value at or above which is desired to prompt an operator to stir the cooking medium. The apparatus also includes means responsive to either the second timer means after a second predetermined time interval or to the temperature-differential-determining means when the temperature differential is less than a predetermined value for canceling the stir prompt signal.

For a better understanding of the present invention, together with other and further objects thereof, reference is made to the following description, taken in connection with the accompanying drawings, and its scope will be pointed out in the appended claims.

Referring now to the drawings.

Figure 1:
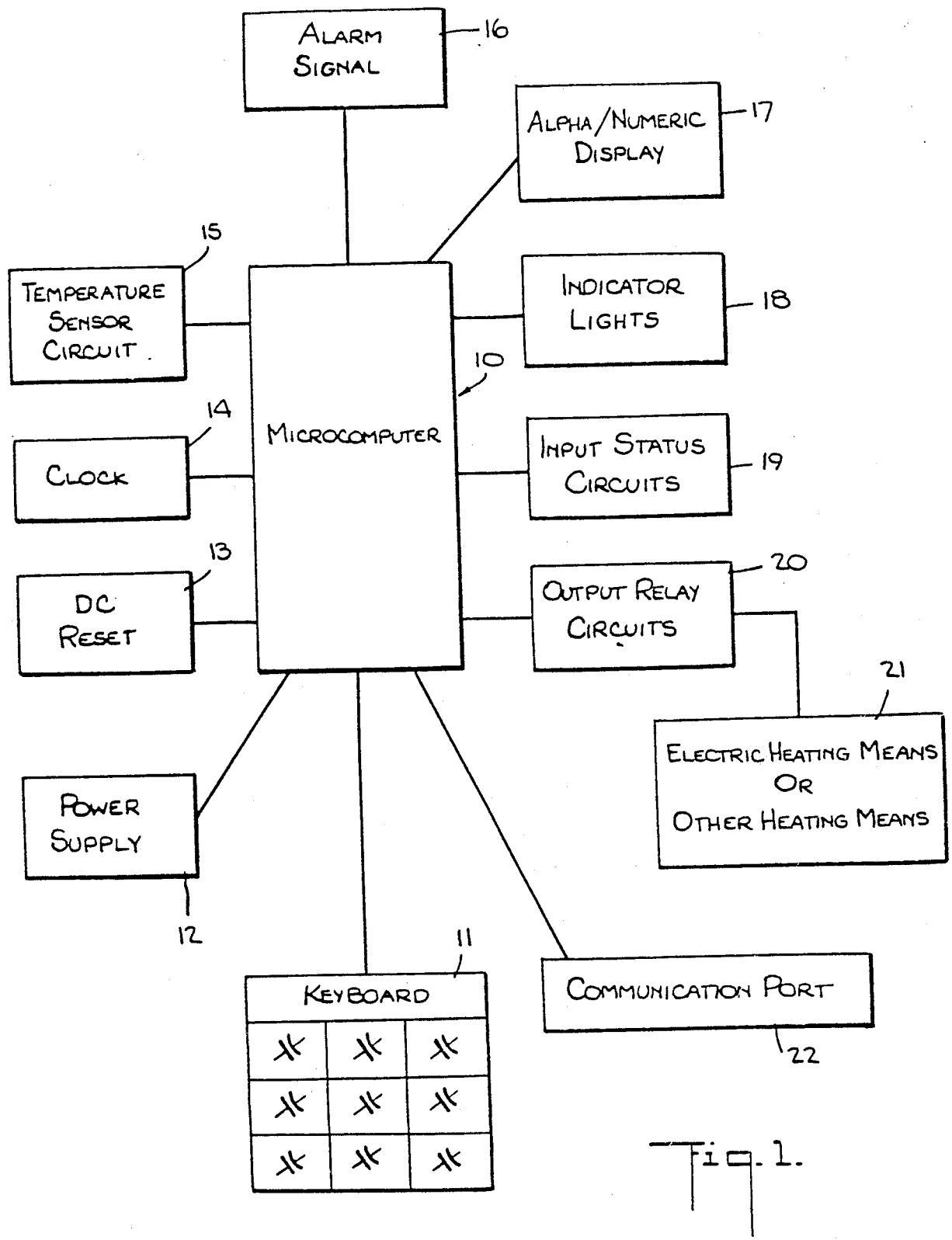
FIG. 1 is a schematic diagram including a portion of a cooking appliance and apparatus constructed in accordance with the invention for prompting an operator to stir a cooking medium in the cooking appliance.
Figure 3:
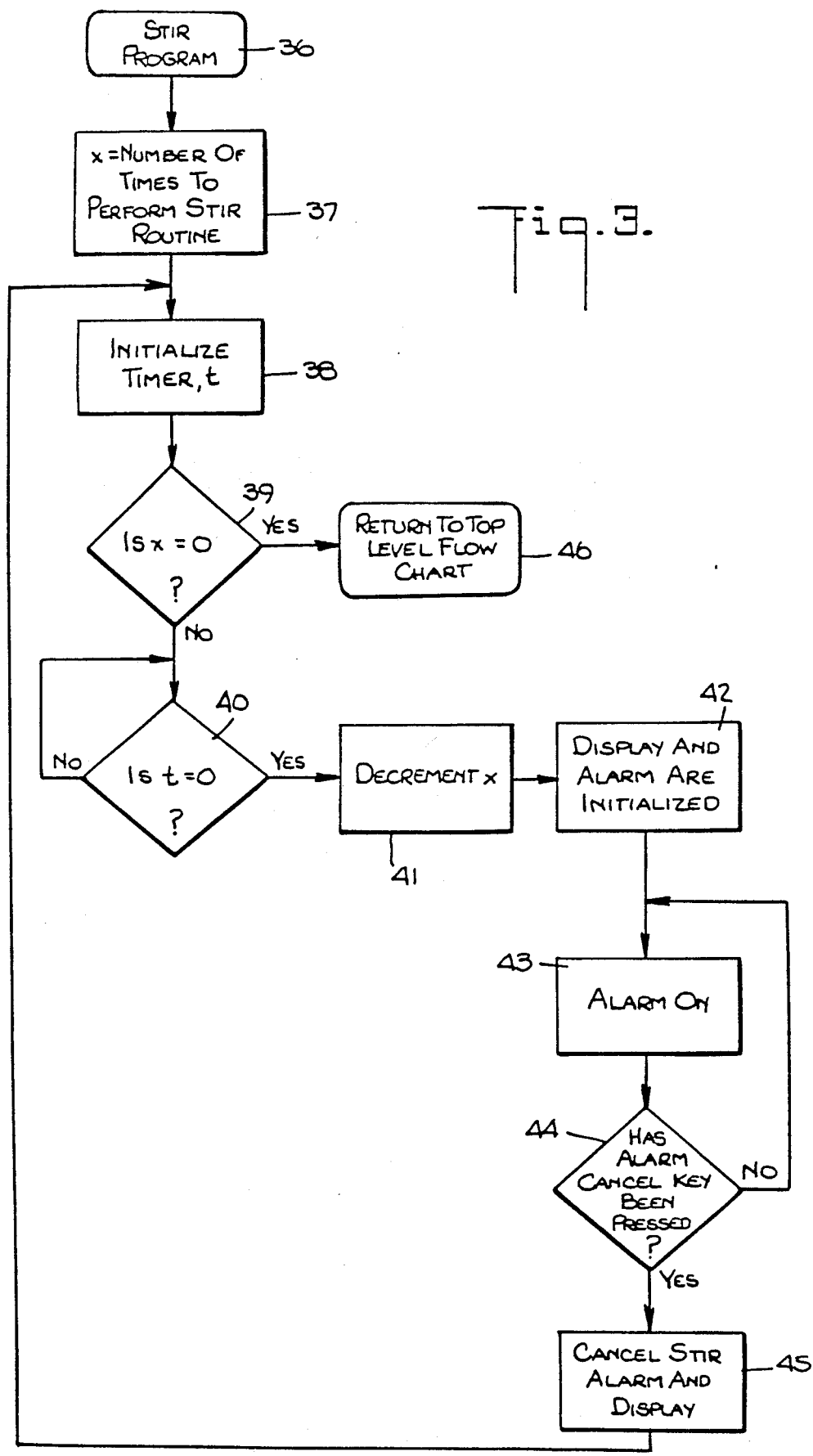
Figure 4:
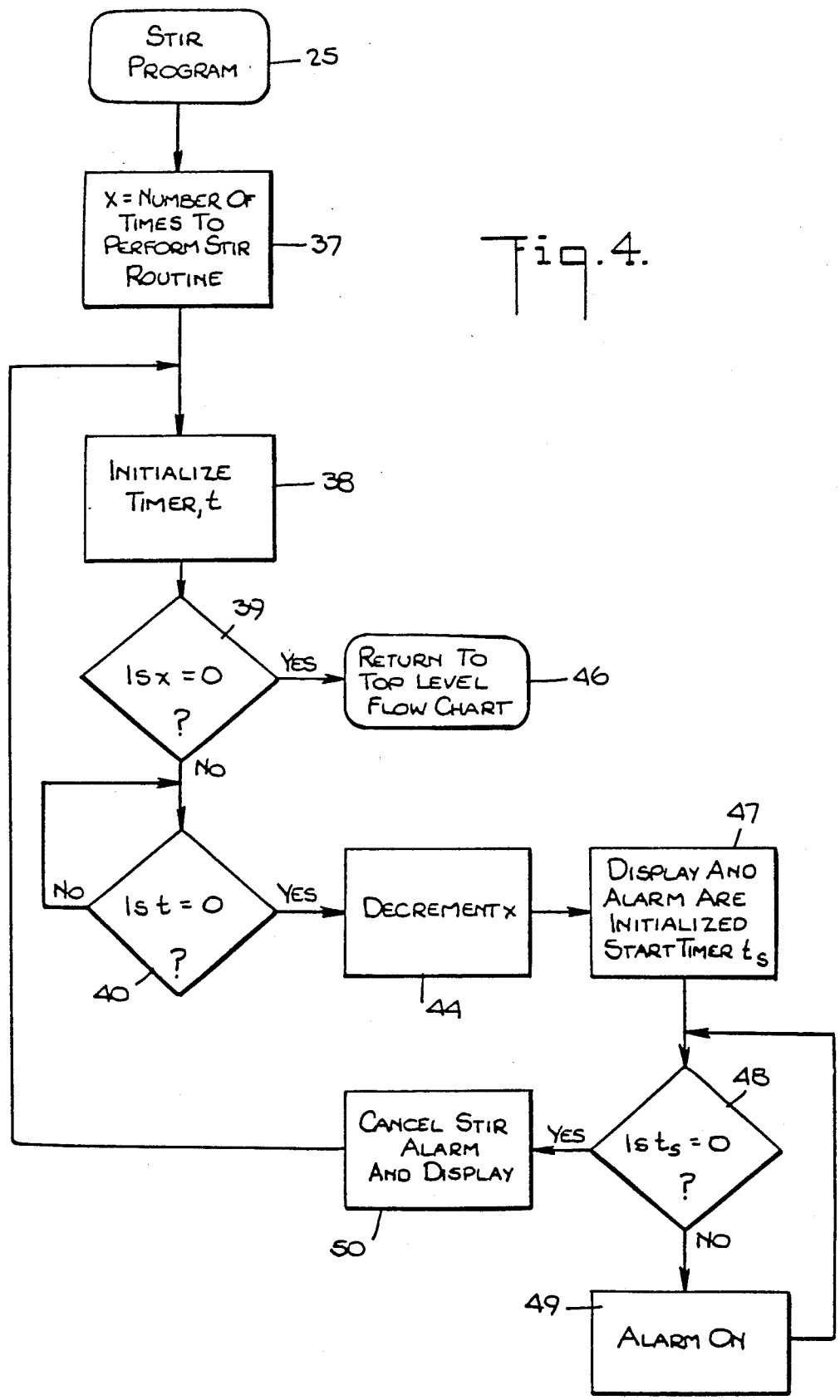
Figure 5:
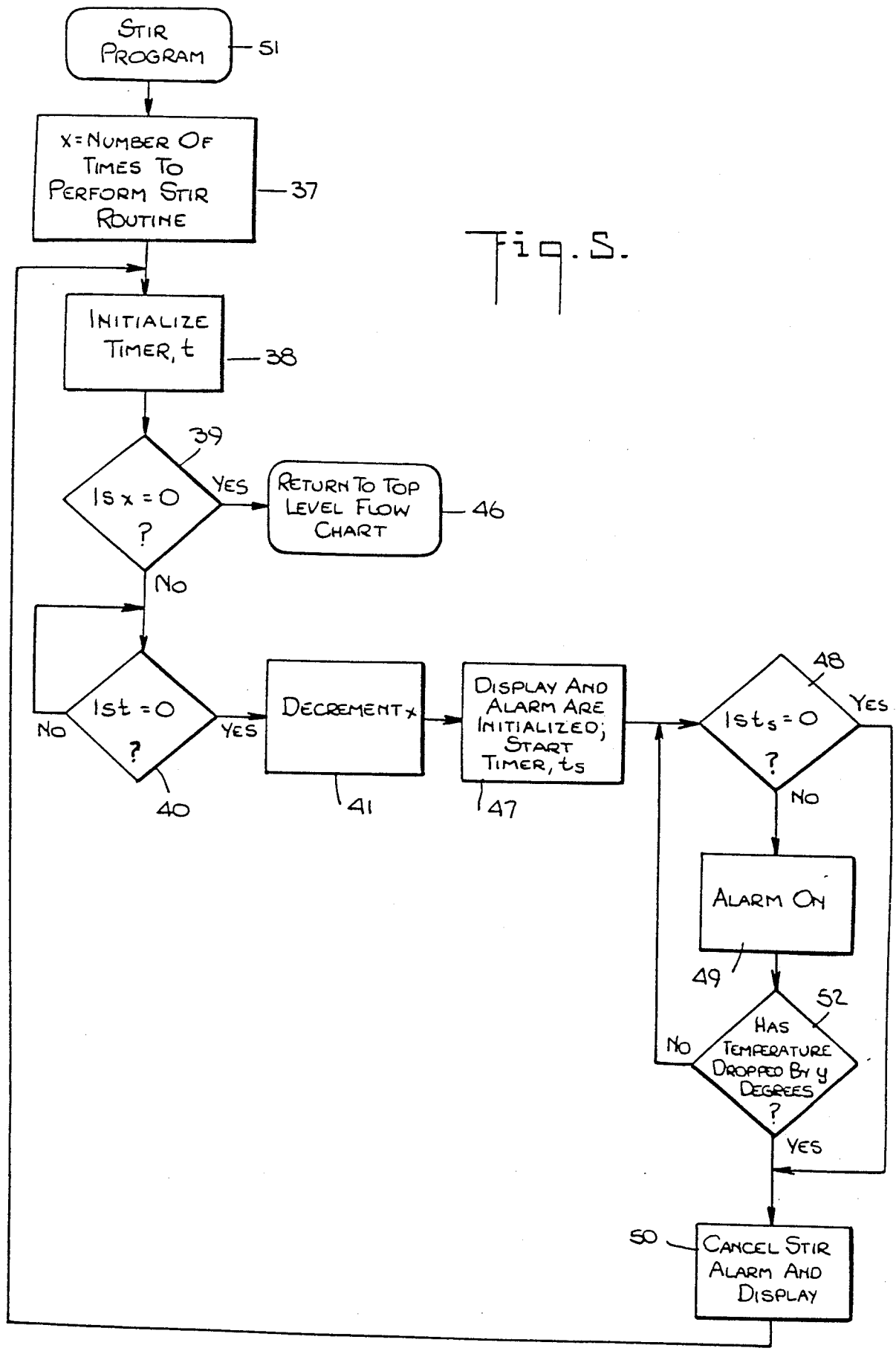
Figure 6:
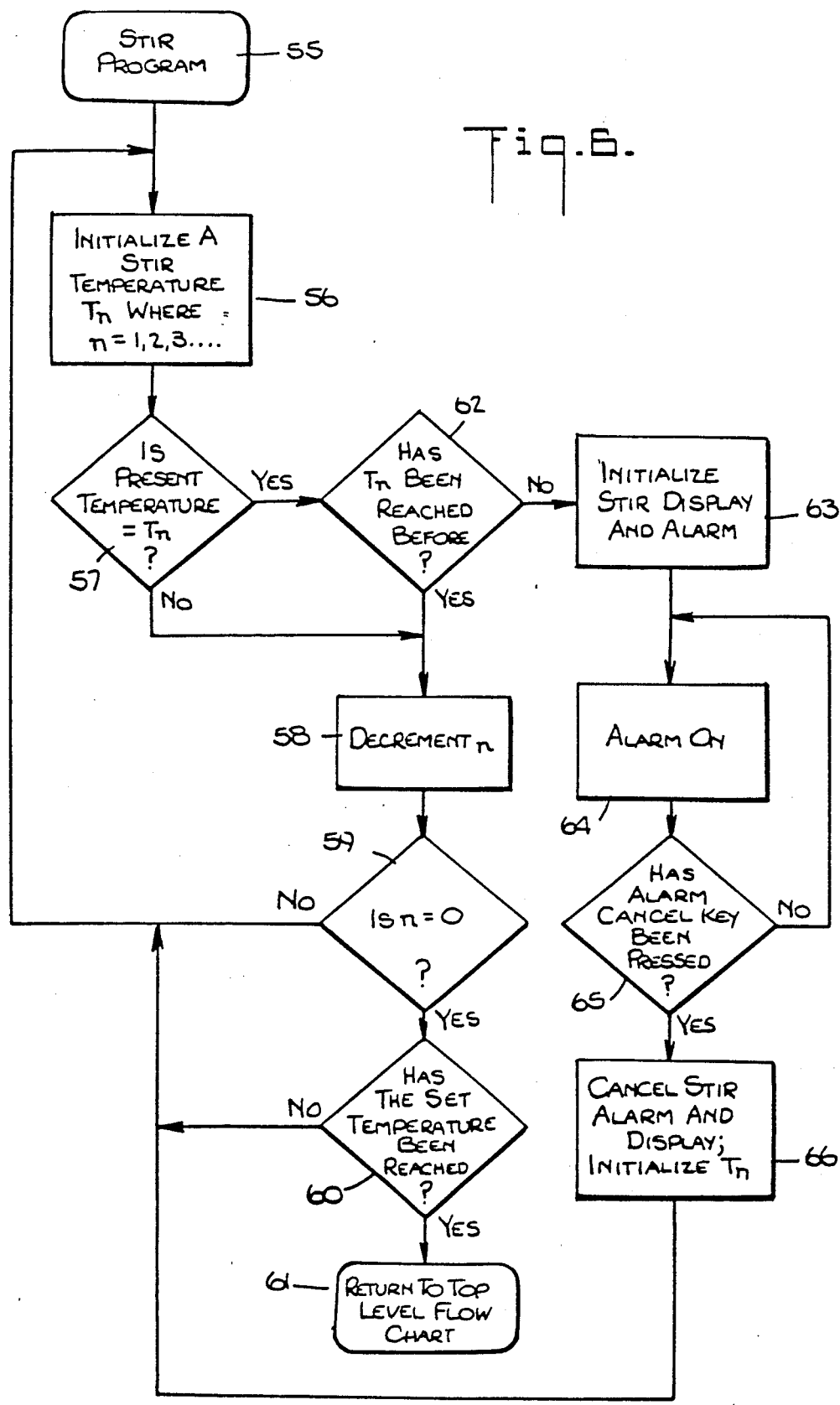
Figure 7:
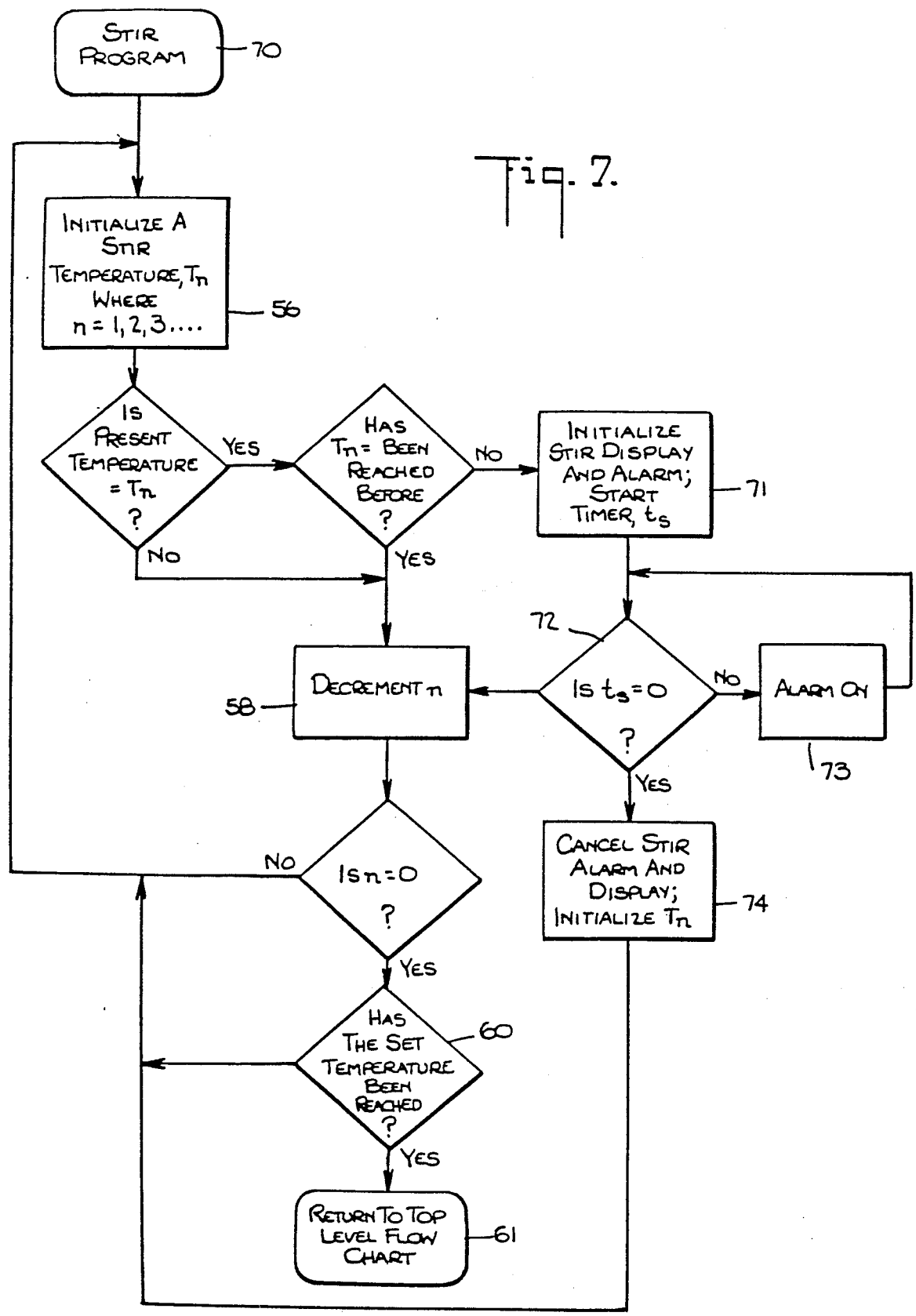
Figure 8:
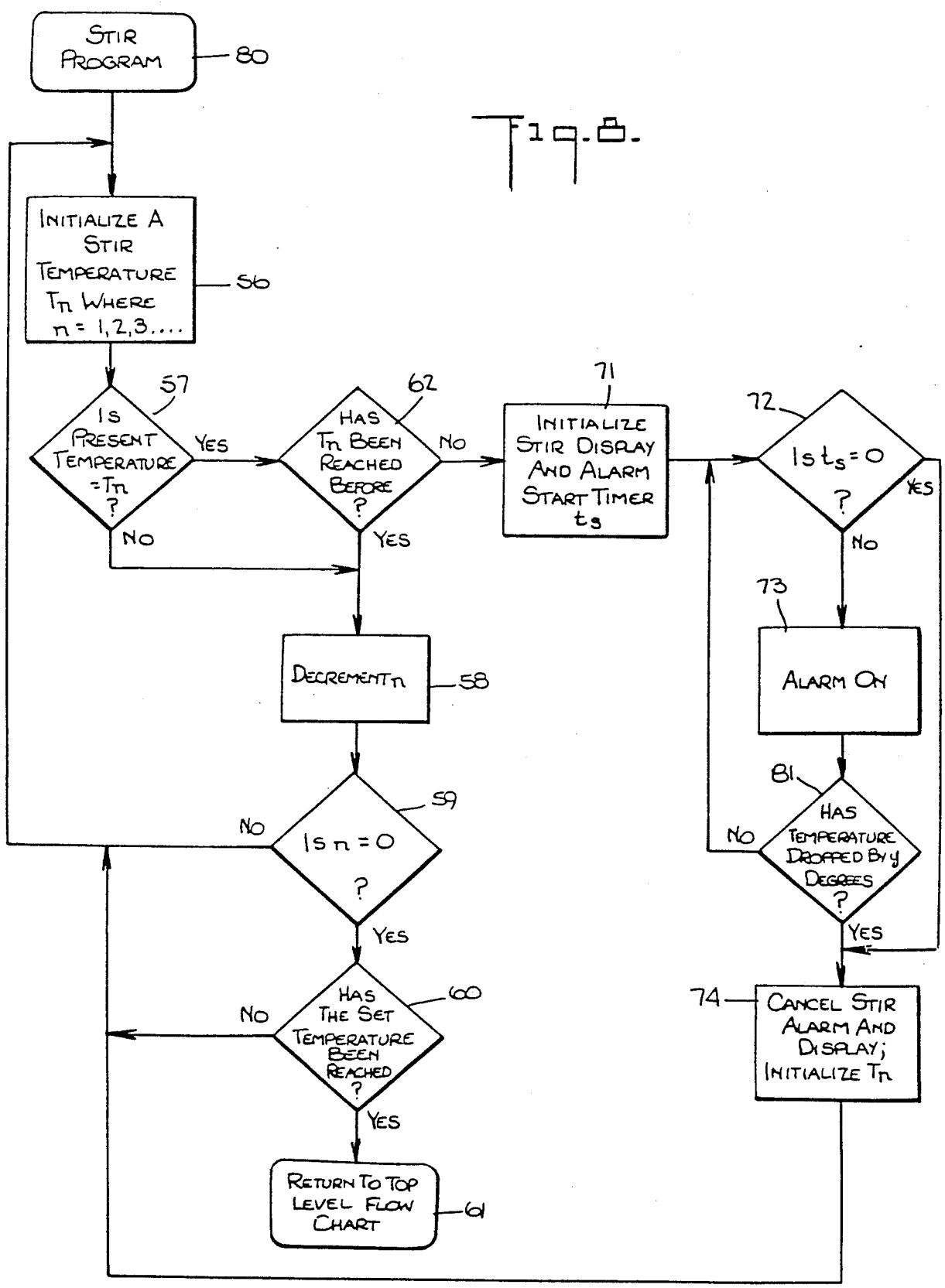
Figure 9:
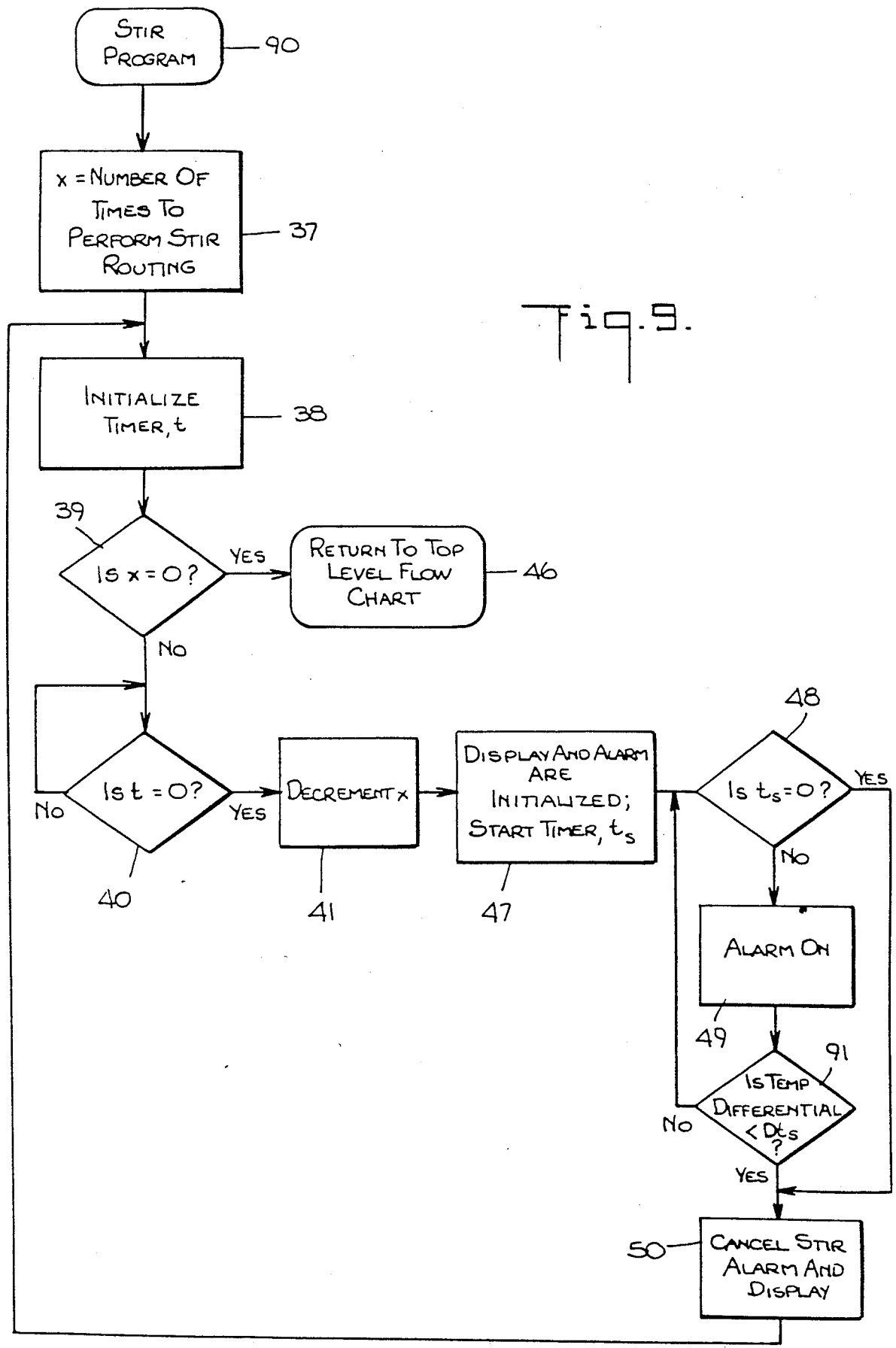
Figure 10:
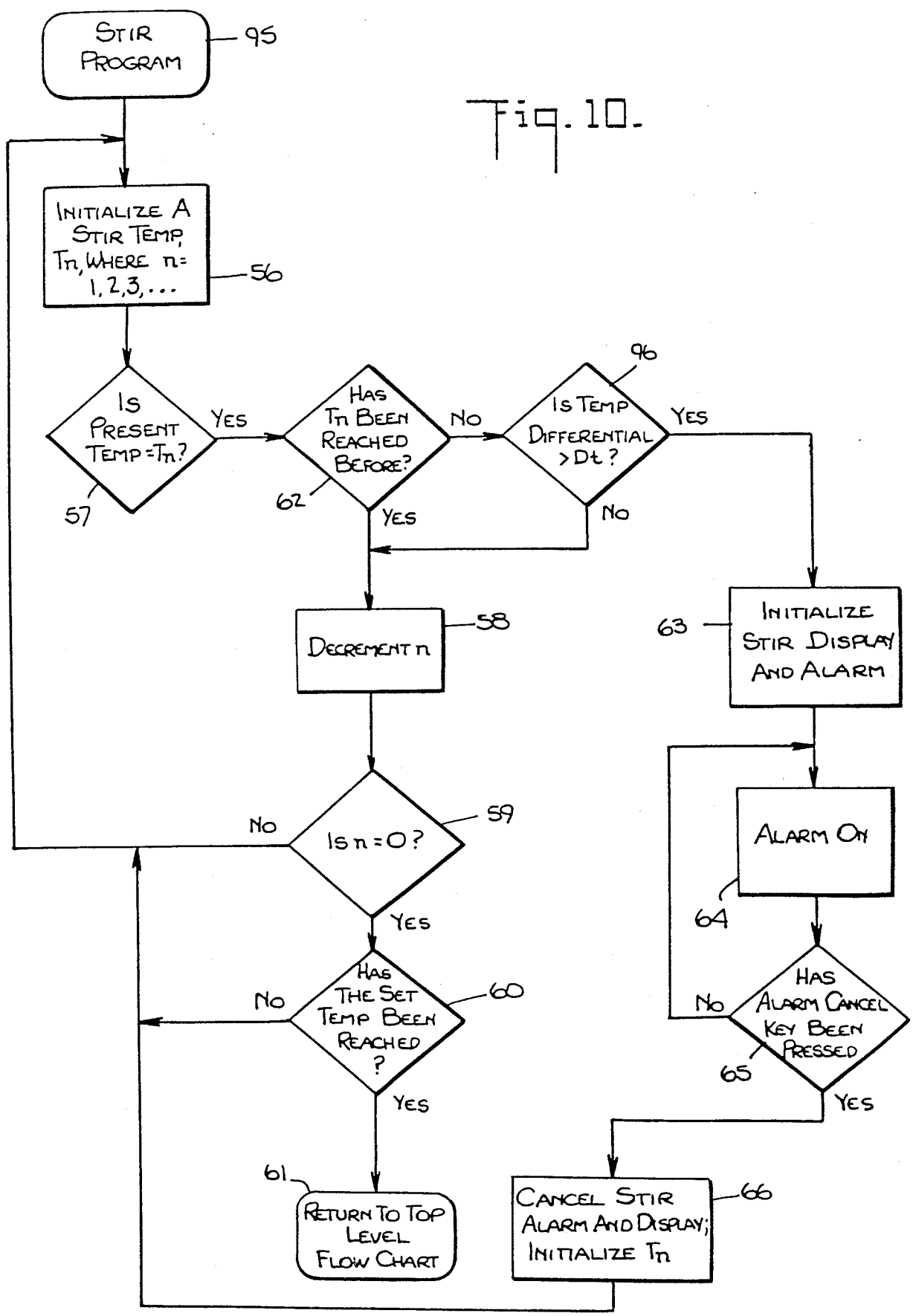
Figure 11:
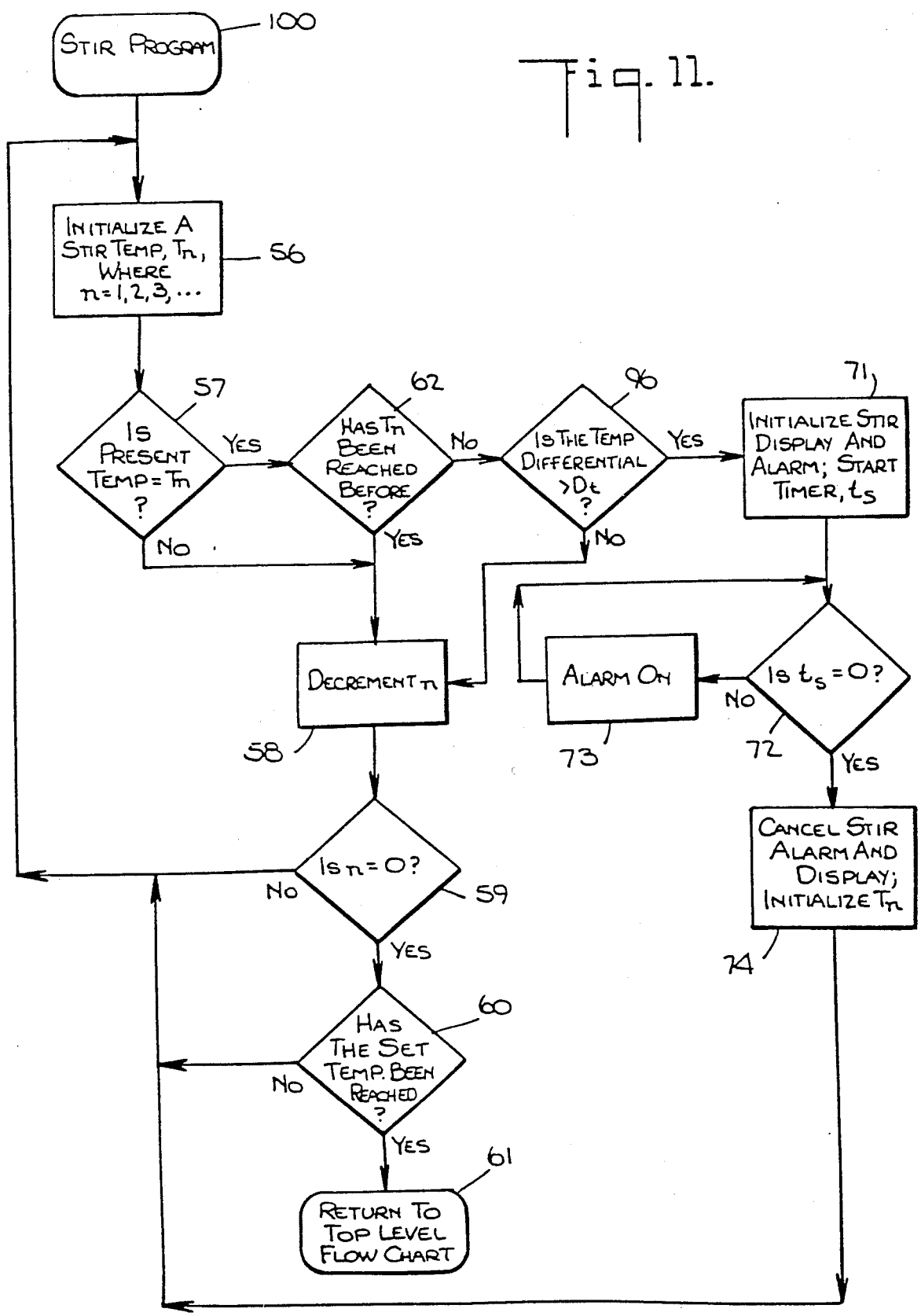
Figure 12:
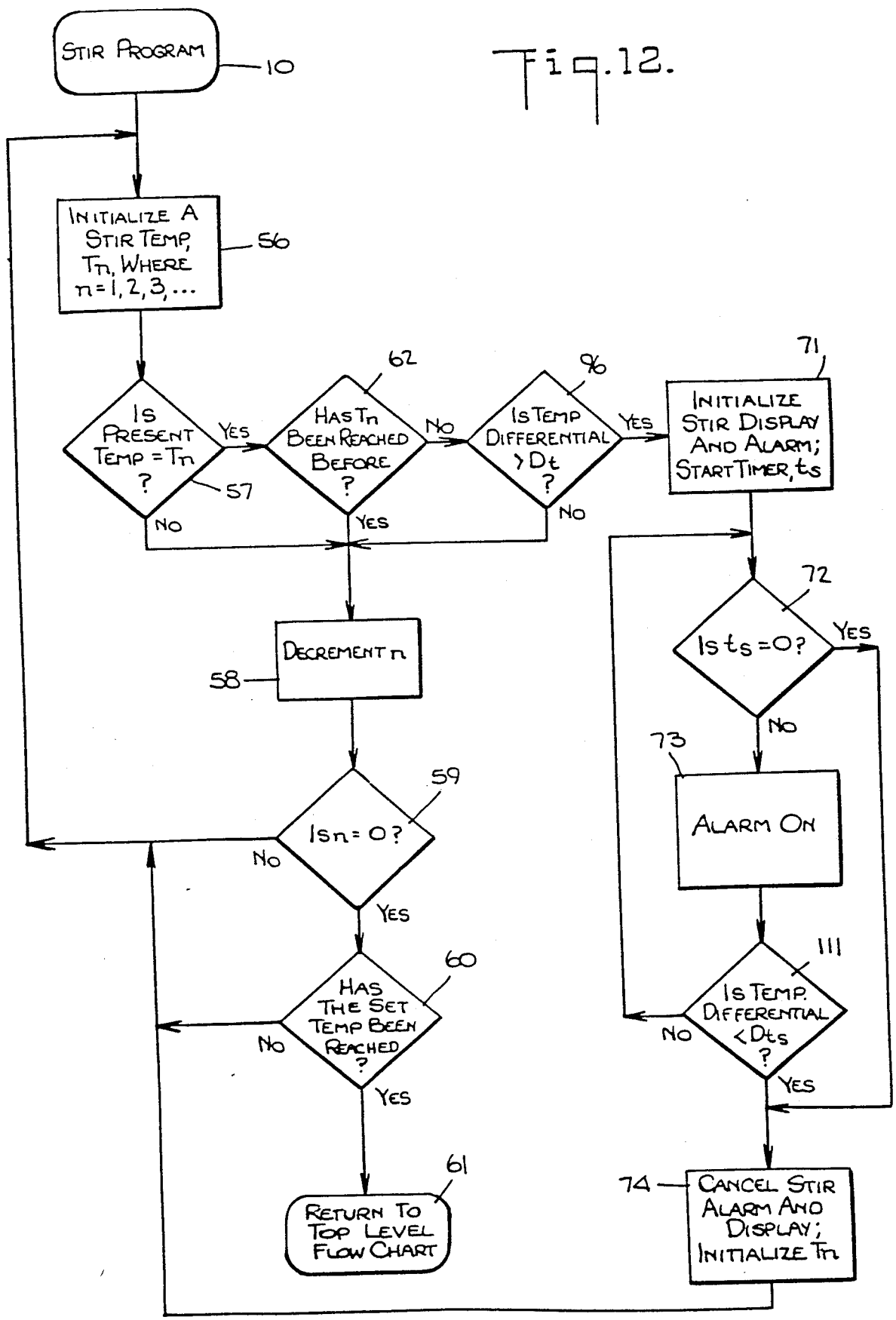

FIG. 3 a flow-chart comprising a schematic representation of a portion of the FIG. 1 apparatus which operates according to a computer program produced according to the flow-chart;

FIG. 4 is a flow-chart comprising a schematic representation of a portion of the FIG. 1 apparatus which operates according to a computer program produced according to the flow-chart;

FIG. 5 is a flow-chart comprising a schematic representation of a portion of the FIG. 1 apparatus which operates according to a computer program produced according to the flow-chart;

FIG. 6 is a flow-chart comprising a schematic representation of a portion of the FIG. 1 apparatus which operates according to a computer program produced according to the flow-chart;

FIG. 7 is a flow-chart comprising a schematic representation of a portion of the FIG. 1 apparatus which operates according to a computer program produced according to the flow-chart;

FIG. 8 is a flow-chart comprising a schematic representation of a portion of the FIG. 1 apparatus which operates according to a computer program produced according to the flow-chart;

FIG. 9 is a flow-chart comprising a schematic representation of a portion of the FIG. 1 apparatus which operates according to a computer program produced according the flow-chart;

FIG. 10 is a flow-chart comprising a schematic representation of a portion of a FIG. 1 apparatus which operates according to a computer program produced according to the flow-chart;

FIG. 11 is a flow-chart comprising a schematic representation of a portion of the FIG. 1 apparatus which operates according to a computer program produced according to the flow-chart; and FIG. 12 is a flow-chart comprising a schematic representation of a portion of the FIG. 1 apparatus which operates according to a computer program produced according to the flow-chart.

Before referring to the drawings in detail, it will be understood that for purposes of clarity, the apparatus represented in the block diagrams of FIGS. 1-8, inclusive, utilize, for example, an analog-to-digital converter and a microprocessor which includes such hardware as a central processing unit, program and random access memories, timing and control circuitry, input-output interface devices and other digital subsystems necessary to the operation of the central processing unit as is well understood by those skilled in the art. The microprocessor operates according to the corresponding computer program produced according to the corresponding flow-chart represented in the drawings.

Apparatus constructed in accordance with the invention for prompting an operator to stir a cooking medium in a cooking appliance may be useful in a cooking appliance such as described in copending application Ser. No. 937,988, filed Dec. 4, 1986 which describes a commercial fryer and describes and claims cooking apparatus. The stir prompt apparatus of the present invention comprises means for determining whether the temperature of a cooking medium is below a predetermined value below which it is desired to prompt an operator to stir the cooking medium. This means comprises, for example, a temperature sensor circuit including, for example, a temperature sensing probe disposed in the cooking medium, for example, shortening. A cooking computer useful in the stir prompt apparatus is represented in FIG. 1.

Referring now more particularly to FIG. 1, a microcomputer 10 includes a central processing unit which receives an input from a keyboard 11 which may, for example, comprise a capacitive keyboard. The apparatus of FIG. 1 includes a conventional power supply 12, a reset circuit 13 for resetting the microcomputer when renewing power in the power supply, a clock oscillator 14 for providing clock pulses to the microcomputer 10, a temperature sensor circuit 15 for sensing the temperature within the cooking apparatus, an audible alarm 16, an alpha-numeric display 17 and indicator lights 18. The apparatus also includes an input status circuit 19 which may, for example, be responsive to a door switch (not shown) and to the open/close position of a drain valve (not shown). The microcomputer controls an output relay circuit 20 which may, for example, control the electric heating elements or gas valves of a burner or other heating means 21. The apparatus also includes a communication port 22 for transmitting signals to and from other apparatus.

The temperature sensor circuit may comprise a single temperature-sensing probe or may, in some embodiments, comprise two or more temperature-sensing probes at different locations in the cooking medium for providing signals representing the temperatures at different locations in the cooking medium. The microprocessor may then include means for determining the temperature differential of the cooking medium at different locations in the cooking medium.

Figure 2:
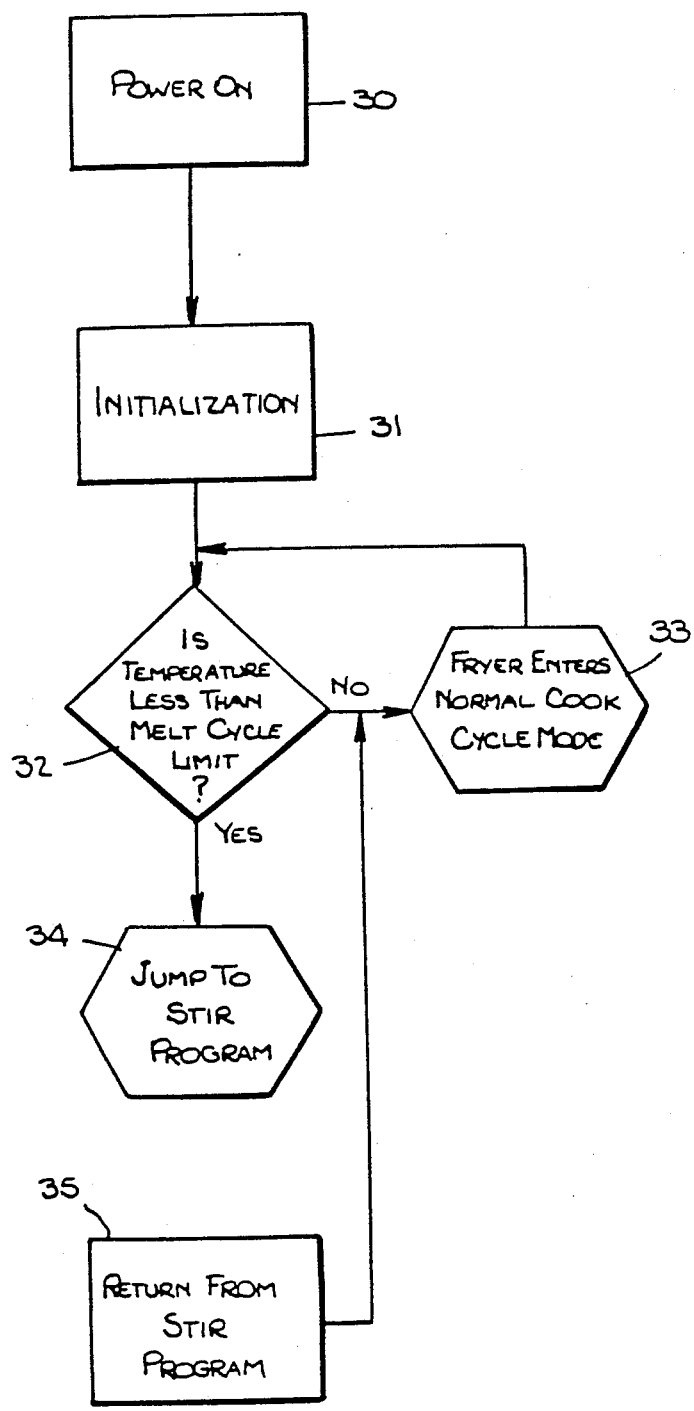
FIG. 2 is a flow-chart comprising a schematic representation of a portion of the FIG. 1 apparatus which operates according to a computer program produced according to the flow-chart.

Referring now to FIG. 2, there is represented a top level flow chart for the stir program which shows the entry to and exit from the stir program. The microcomputer 10 is programmed in accordance with selected ones of the flow charts of FIGS. 2–8, inclusive. The microcomputer 10 has a "power on" microprocessor portion 30 which actuates an "initialization" microprocessor portion 31 which conditions the means for determining whether the temperature of a cooking medium is below a predetermined value below which it is desired to prompt an operator to stir the cooking medium. This means also comprises an "is temperature less than melt cycle limit?" microprocessor portion 32. At this time the fryer is in a melt cycle or mode wherein the shortening can be melted. The "no" output of the microprocessor portion 32 is coupled to a "fryer enters normal cook cycle mode" microprocessor portion 33 which is, in turn, coupled in an idle loop to the input of microprocessor portion 32.

The "yes" output of the microprocessor portion 32 is coupled to a "jump to stir program" microprocessor portion 34. The microprocessor 10 also includes a "return from stir program" microprocessor portion 35 which is coupled to one of the selected flow charts of FIGS. 3–8, inclusive, as will be more fully explained subsequently. The microprocessor portion 35 is coupled to the input of the microprocessor portion 33.

Referring now to FIGS. 2 and 3 of the drawings, FIG. 3 represents a flow chart for a stir program based on timer expiration for initiating a stir alarm and display and manual cancellation of the stir alarm and display. The "jump to stir program" microprocessor portion 34 of FIG. 1 may be coupled to the "stir program" microprocessor portion 36 of FIG. 3. The microcomputer includes register means responsive to the temperature-determining means when the temperature of the cooking medium is below the predetermined value for determining the number of times stirring is to be performed. The microprocessor portion 36 is coupled to a "x equals number of times to perform stir routine" microprocessor portion 37.

The microcomputer also includes timer means responsive to the temperature-determining means for determining the time interval between stir prompt signals to be initialized. The microprocessor portion 37 is coupled to an "initialize timer, t" microprocessor portion 38 which is coupled to an "is x equal to zero?" microprocessor portion 39. The "no" output of the microprocessor portion 39 is coupled to an "is t equal to zero?" microprocessor portion 40. Timer means responsive to the temperature-determining means for determining a predetermined time interval between stir prompt signals to be initialized comprises the microprocessor portion 40. The "no" output of the microprocessor portion 40 is coupled in a loop to the input of the microprocessor portion 40 so that the timer continues to count down until t equals zero.

The microcomputer also includes decrementing means responsive to the timer means for decrementing the register means when the timer means has timed the predetermined time interval and stirring is to be performed. The decrementing means comprises a "decrement x" microprocessor portion 41.

The microcomputer also includes means responsive to the decrementing means for initializing a stir prompt signal to an operator to stir the cooking medium. The output of the microprocessor portion 41 is coupled to a "display and alarm are initialized" microprocessor portion 42. The microprocessor portion 42 is coupled to an "alarm on" microprocessor portion 43. The apparatus includes means responsive to the initializing means for rendering a stir prompt signal. Thus, the microprocessor portion 43 controls the alarm signal 16 and the alpha-numeric display 17 of FIG. 2.

The apparatus also includes means for initializing a cancellation of the stir prompt signal when actuated. This means may comprise an alarm cancel key which is manually actuated. The alarm cancel key is preferably at the fryer so that the operator is prompted to go to the vat and press the alarm cancel key and to stir the fryer vat vigorously. The apparatus also includes means responsive to the cancellation-initializing means for determining whether the cancellation-initializing means has been actuated. The microprocessor portion 43 is coupled to a "has alarm cancel key been pressed?" microprocessor portion 44. The "no" output of the microprocessor portion 44 is coupled in an idle loop to the input of the microprocessor portion 43.

The apparatus also includes means responsive to the actuation of the cancellation-initializing means for canceling the stir prompt signal. The "yes" output of the microprocessor portion 44 is coupled to a "cancel stir alarm and display" microprocessor portion 45 which is coupled to the input of the "initialize timer, t" microprocessor portion 38 to re-initialize the timer, t. The loop is repeated x times. When x=0, the stir program is terminated and control returns to the top level flow chart (FIG. 2). The "yes" output of the "is x equal to zero?" microprocessor portion 49 is coupled to a "return to top level flow chart" microprocessor portion 46.

Referring now to FIG. 4, FIG. 4 represents a flow-chart for a stir program based on timer expiration, and automatic cancellation of stir alarm and display. The "jump to stir program" microprocessor portion 34 of FIG. 1 may be coupled to the "stir program" microprocessor portion 25 of FIG. 4. The microprocessor portions 37, 38, 39, 40, 41 and 46 may be the same as corresponding microprocessor portions represented in FIG. 3 and, accordingly, will not be described again.

To effect automatic cancellation of the stir alarm and display, the FIG. 4 apparatus includes second timer means and means responsive to the decrementing means for initializing a stir prompt signal to an operator to stir the cooking medium and for starting the second timer means. The "decrement x" microprocessor portion 41 is coupled to a "display and alarm are initialized; start timer, $t_s$" microprocessor portion 47. The FIG. 4 apparatus also includes means responsive to the initializing means for rendering a stir prompt signal before the elapse of a second predetermined time interval. The microprocessor portion 47 is coupled to a "is $t_s$ equal to zero?" microprocessor portion 48. The "no" output of the microprocessor portion 48 is coupled to an "alarm on" microprocessor portion 49. The microprocessor portion 49 controls the alarm signal 16 and the alphanumeric display 17 of FIG. 2. The "no" output of the "alarm on" microprocessor portion 49 is coupled in a loop to the input of microprocessor portion 48. The apparatus also includes means responsive to the second timer means after a second predetermined time interval for canceling the stir prompt signal, for example, when the second timer means reaches zero. The "yes" output of the microprocessor portion 48 is coupled to a "cancel stir alarm and display" microprocessor portion 50. The output of the microprocessor portion 50 is coupled to the input of the microprocessor portion 38.

If the operator responds to the alarm quickly and stirs vigorously for several seconds, the shortening temperature is at a much lower temperature after being stirred than it was prior to the stir. The shortening temperature differential can be used to cancel the alarm before the time expires, as will be described in connection with FIG. 5.

Referring now to FIG. 5, FIG. 5 is a flow-chart for a stir program based on timer expiration, and an automatic cancellation of alarm and display when a temperature drop is detected or a timer expires. The "jump to stir program" microprocessor portion 34 of FIG. 1 may be coupled to the "stir program" microprocessor portion 51 of FIG. 4. The microprocessor portions 37, 38, 39, 40, 41, 46, 47, 48, 49 may be the same as corresponding microprocessor portions represented in FIG. 4 and, accordingly, will not be described again.

The FIG. 5 apparatus includes means responsive to the second timer means for determining whether the temperature of the cooking medium has decreased by a predetermined amount. The means responsive to the second timer means is responsive to either the second timer means and after the second predetermined time interval or to the temperature-determining means when the temperature has decreased by a predetermined amount for canceling the stir prompt signal. The "alarm on" microprocessor portion 49 is coupled to a "has temperature dropped by y degrees?" microprocessor portion 52. The "no" output of the microprocessor portion 52 is coupled in a loop to the input of the microprocessor portion 48. The "yes" output of the microprocessor portion 52 and the "yes" output of the microprocessor portion 48 are coupled to the "cancel stir alarm and display" microprocessor portion 50.

Referring now more particularly to FIG. 6, FIG. 6 is a flow-chart for a stir program based on temperature control, and manual cancellation of stir display and alarm. The FIG. 6 apparatus includes register means for storing a number of selected values of stir prompt temperatures. The stir program microprocessor portion 55 is coupled to an "initialize a stir temperature $T_n$ where n equals 1, 2, 3, . . . " microprocessor portion 56. The values of $T_n$ are pre-selected temperatures at which a stir prompt signal may be given to an operator.

The apparatus also includes means responsive to the temperature-determining means 31, 32 (FIG. 2) for selecting a first stir prompt temperature from the register means. The stir prompt temperature-selecting means comprises the microprocessor portion 56.

The apparatus includes means for determining the present temperature of the cooking medium comprising the temperature sensor circuit 15 of FIG. 1. The apparatus also includes means responsive to the present temperature of the cooking medium for determining whether the present temperature equals the selected first stir prompt temperature. This means comprises an "is present temperature equal to $T_n$?" microprocessor portion 57 coupled to the output of the microprocessor portion 56 and to the temperature sensor circuit 15 of FIG. 1.

The apparatus also includes means responsive to the equal-temperature determining means for decrementing the number of selected stir prompt temperature values of the register means if the present temperature does not equal the selected first stir prompt temperature. The "no" output of the microprocessor portion 57 is coupled to a "decrement n" microprocessor portion 58.

The apparatus also includes means responsive to the decrementing means for determining whether the number of selected temperature values remaining after each decrementing is zero. The output of the microprocessor portion 58 is coupled to an "is n equal to zero?" microprocessor portion 59.

The apparatus also includes means responsive to a remaining number other than zero of selected temperature values for selecting a second stir prompt temperature from the register means. The "no" output of the microprocessor portion 59 is coupled to the input of the "initialize a stir temperature $T_n$" microprocessor portion 56 which, for example, after one decrementing initializes a stir temperature $T_2$.

The microprocessor portions 56, 57, 58, 59 continue to operate as described until $T_n$ equals zero. At that time the "is n equal to zero?" microprocessor portion 59 provides a "yes" output to a "has the set temperature been reached?" microprocessor portion 60. If the set temperature has been reached the "yes" output of the microprocessor portion 60 activates a "return to top level flow-chart" microprocessor portion 61.

The apparatus includes means for selecting a stir prompt temperature from the register means if the set temperature has not been reached. The "no" output of the microprocessor portion 60 is coupled to the input of the microprocessor portion 56 where n is decremented again by the microprocessor portion 60.

The apparatus includes means responsive to the equal-temperature determining means for determining whether the present temperature has been reached previously if the present temperature equals the selected first stir prompt temperature. The "yes" output of the microprocessor portion 57 is coupled to a "has $T_n$ been reached before?" microprocessor portion 62.

The apparatus also includes means responsive to the present temperature having been reached previously for decrementing the number of selected stir prompt temperature values of the temperature means. The "yes" output of the microprocessor portion 62 is coupled to the input of the "decrement n" microprocessor portion 58.

The apparatus also includes means responsive to the present temperature not having been reached previously for initializing a stir prompt signal to an operator to stir the cooking medium. The "no" output of the microprocessor portion 62 is coupled to an "initialize stir display and alarm" microprocessor portion 63. The apparatus includes means responsive to the initializing means for rendering a stir prompt signal. The output of the "initialize stir display and alarm" microprocessor portion 63 is coupled to an "alarm on" microprocessor portion 64.

The microprocessor portion 64 controls the alarm signal 16 and the alpha-numeric display 17 of FIG. 2. The apparatus also includes means for initializing a cancellation of the stir prompt signal when actuated. The means for initializing a cancellation of the stir prompt signal when actuated may comprise an alarm cancel key which is manually actuated. The apparatus also includes means responsive to the cancellation-initializing means for determining whether the cancellation-initializing means has been actuated. The microprocessor portion 64 is coupled to a "has alarm cancel key been pressed?" microprocessor portion 65. The "no" output of the microprocessor portion 65 is coupled in an idle loop to the input of the microprocessor portion 64.

The apparatus also includes means responsive to the actuation of the cancellation-initializing means for canceling the stir prompt signal and for selecting a second stir prompt temperature. The "yes" output of the microprocessor portion 65 is coupled to a "cancel stir alarm and display, initialize $T_n$" microprocessor portion 66. The output of the microprocessor portion 66 is coupled to the "initialize a stir temperature $T_n$" microprocessor portion 56.

Referring now to FIG. 7, there is represented a flow-chart for stir program based on temperature control, and automatic cancellation of stir display and alarm. The stir program 70 microprocessor portion is coupled to temperature control microprocessor portions 56, 57, 58, 59, 60, 61, 62 which may be the same as the corresponding microprocessor portions of FIG. 6 and, accordingly, will not be described again.

The FIG. 7 apparatus also includes timer means. The apparatus includes means responsive to the present temperature when the present temperature has not been reached previously for initializing a stir prompt signal and for starting the timer means. The "no" output of the microprocessor portion 62 is coupled to an "initialize stir display and alarm; start timer $t_s$" microprocessor portion 71.

The apparatus also includes means responsive to the initializing means 71 for rendering a stir prompt signal. The output of the microprocessor portion 71 is coupled to a "is $t_s$ equal zero?" microprocessor portion 72. The timer $t_s$ is initialized for s seconds, the duration of the alarm. The "no" output of the microprocessor portion 72 is coupled to an "alarm on" microprocessor portion 73 which controls and turns on the alarm signal 16 and the alpha-numeric display 17 of FIG. 2 during the time the timer is counting down $t_s$ to zero.

The apparatus also includes means responsive to the timer means after a predetermined time interval for canceling the stir prompt signal. The "yes" output of the microprocessor portion 72 is coupled to a "cancel stir alarm and display; initialize $T_n$" microprocessor portion 74. Accordingly, the apparatus includes signal-canceling means for canceling the stir prompt signal when the timer means reaches zero. The output of the microprocessor portion 74 is coupled to the input of "initialize a stir temperature $T_n$" microprocessor portion 56. The output of the "alarm on" microprocessor portion 73 is coupled in a loop to the input of microprocessor portion 72.

Referring now to FIG. 8, FIG. 8 represents a flow-chart for a stir program based on temperature control, and automatic cancellation of display and alarm when a temperature drop is detected or a timer expires. The stir prompt program 80 is coupled to microprocessor portions 56, 57, 62, 58, 59, 60, 61, 71, 72, 73 and 74 which may be the same as corresponding microprocessor portions of the FIG. 7 apparatus and, accordingly, will not be further described. The FIG. 8 apparatus includes means responsive to the timer means for determining whether the temperature of the cooking medium has decreased by a predetermined amount. The "no" output of the "is $t_s$ equal to zero" microprocessor portion 72 is coupled to the "alarm on" microprocessor portion 73. The microprocessor portion 73 is coupled to a "has temperature dropped y degrees?" microprocessor portion 81, which is responsive to an "alarm on" signal.

The apparatus also includes means responsive to either the timer means after a predetermined time interval or to the temperature-determining means when the temperature has decreased by the predetermined amount for canceling the stir prompt signal. The "yes" output of the microprocessor portion 72 is coupled to the input of the "cancel stir alarm and display; initialize $T_n$" microprocessor portion 74 and the "yes" output of the "has temperature dropped y degrees?" microprocessor portion 81 is coupled to the microprocessor portion 74. If the temperature drop of at least y degrees is sensed, the stir alarm display is canceled, overriding the timer $t_s$ and re-initializing the stir temperature $T_n$. The "no" output of the microprocessor portion 81 is coupled in a loop to the input of the microprocessor portion 72.

From the foregoing description, it will be apparent that the stir program preferably can be entered at the initial power on and initialization only if the fryer is in the melt cycle. All six variations of the stir program preferably operate in this manner. When the stir algorithm is complete, a cook cycle can be initiated.

In connection with the stir program based on timer expiration, and manual cancellation of stir alarm and display (FIG. 3), a timer is utilized to initiate the stir program. Any number of stir alarms can be sounded at specified time intervals. The operator preferably is required to press a key on the computer to cancel this alarm prior to stirring.

With a stir program based on timer expiration, and automatic cancellation of stir alarm and display based on timer expiration (FIG. 4), a timer is utilized to initiate the stir program. Any number of stir alarms can be sounded at specified time intervals. The alarm and display will automatically be canceled at the alarm timer expiration. The operator has been alerted that a stir time has been reached.

With a stir program based on timer expiration, and automatic cancellation of stir alarm and display based on timer expiration or temperature drop (FIG. 5), a timer is utilized to initiate the stir program. Any number of stir alarms can be sounded at specified time intervals. The alarm and display will automatically be canceled if a specified temperature drop is sensed prior to the alarm timer expiration. If a temperature decrease is not detected, the alarm timer expiration will cancel the alarm. Vigorously stirring the shortening for several seconds will cause a temperature differential that can be used to override the automatic timer cancellation.

With a stir program based on a temperature control algorithm, and manual cancellation of stir alarm and display (FIG. 6), the shortening temperature is used to initiate the stir program. The present temperature is compared to predetermined stir temperatures. If a stir temperature is detected, a check is made to determine if the temperature has been reached previously. If so, the stir alarm is not sounded. This prevents constantly harassing an operator if the temperature drops during stir to a previous stir temperature. When the set temperature is achieved, the stir feature preferably is canceled and preferably can only be reinstated upon entry into the melt cycle. The operator preferably is required to press a key on the computer to cancel this alarm prior to stirring.

With a program based on a temperature control algorithm, and automatic cancellation of stir alarm and display based on timer expiration (FIG. 7), the shortening temperature is used to initiate the stir program. The present temperature is compared to predetermined stir temperatures. If a stir temperature is detected, a check is made to determine if the temperature has been reached previously. If so, the stir alarm is not sounded. This prevents constantly harassing an operator if the temperature drops during stir to a previous stir temperature. When the set temperature is achieved, the stir feature preferably is canceled and preferably can only be reinstated upon entering into melt cycle. The alarm and display will automatically be canceled at the alarm timer expiration. The operator has been alerted that a stir time has been reached.

With a stir program based on a temperature control algorithm, and automatic cancellation of stir based on timer expiration or temperature drop (FIG. 8), the shortening temperature is used to initiate the stir program. The present temperature is compared to predetermined stir temperatures. If a stir temperature is detected, a check is made if the stir temperature has been reached previously. If so, the stir alarm is not sounded. This prevents constantly harassing an operator if the temperature drops during stir to a previous stir temperature. When the set temperature is achieved, the stir feature preferably is canceled and preferably can only be reinstated upon entering into the melt cycle. The alarm and display will automatically be canceled if a specified temperature drop is sensed prior to the alarm timer expiration. If a temperature decrease is not detected, the alarm timer expiration will cancel the alarm. Vigorously stirring the shortening for several seconds will cause a temperature differential that can be used to override the automatic cancel.

Referring now to FIG. 9, FIG. 9 is a flow-chart for a stir program using the shortening temperature differential as measured by two probes of apparatus 15 placed a predetermined distance apart in the fryer vat. The FIG. 9 flow-chart is based on timer expiration, with automatic cancellation of the display and alarm based on timer expiration or temperature differential between the two probes. The "jump to stir program" microprocessor portion 34 of FIG. 1 may be coupled to the "stir program" microprocessor portion 90 of FIG. 9. The microprocessor portions 37, 38, 39, 40, 41, 46, 47, 48, 49, 50 may be the same as corresponding microprocessor portions represented in FIG. 5 and, accordingly will not be described again.

The FIG. 9 apparatus includes means 91 responsive to the second timer means ts for determining whether the temperature differential of the cooking medium at the probes has decreased to less than a predetermined differential Dts. The means 91 responsive to the second timer means is responsive to either the second timer means after the second predetermined time interval or to the temperature-differential-determining means when the temperature differential has decreased to less than a predetermined differential Dts for canceling the stir prompt signal. The "alarm on" microprocessor portion 49 is coupled to an "is temperature differential less than Dts?" microprocessor portion 91. The "no" output of the microprocessor portion 91 is coupled in a loop to the input of the microprocessor portion 48. The "yes" output of the microprocessor portion 91 and the "yes" output of the microprocessor portion 48 are coupled to the "cancel stir alarm and display" microprocessor portion 50.

This apparatus utilizes a timer to initiate the stir program. Any number of stir alarms can be sounded at specified time intervals. The alarm and display will automatically cancel if a specified decrease in temperature differential, Dts, is sensed between the measured temperature differential and the programmed temperature differential prior to the alarm timer expiration. If a temperature differential decrease is not detected, the alarm timer expiration will cancel the alarm. Vigorously stirring the shortening for several seconds will cause a temperature differential decrease that can be used to override the automatic cancel.

Referring now more particularly to FIG. 10, FIG. 10 is a flow-chart for a stir program based on a dual probe temperature control algorithm and manual cancellation of stir display and alarm. The stir program 95 is coupled to microprocessor portions 56, 57, 62, 58, 59, 60, 61, 63, 64, 65, 66 which may be the same as corresponding microprocessor portions of the FIG. 6 apparatus and accordingly will not be further described. The FIG. 10 apparatus includes an "is temperature differential greater than Dt?" microprocessor portion 96 coupled to the "no" output of the microprocessor portion 62. The temperature differential referred to is the temperature differential between the dual probes of the temperature control. Dt is a predetermined temperature differential. The "no" output of the microprocessor portion 46 is coupled to the "decrement n" microprocessor portion 48. The "yes" output of the microprocessor portion 46 is coupled to the "initialize stir display and alarm" microprocessor portion 63. Thus, when the temperature differential between the two probes is greater than a predetermined temperature differential Dt, the stir display and alarm is initialized. The manual cancellation of the stir display and alarm is the same as that previously described in connection with FIG. 6 and accordingly will not be described again.

This apparatus uses the dual probe temperature control algorithm to initiate the stir program. The present temperature is compared to the predefined stir temperatures. If a stir temperature is detected, a check is made to determine if the temperature had been reached previously. If so, the stir alarm is not sounded. This prevents constantly harassing an operator if the temperature drops during stir to a previous stir temperature. If the stir temperature has not been reached previously, the programmed temperature differential Dt is compared to the measured temperature differential. If the measured differential exceeds the programmed differential, the stir alarm and display are activated. When the programmed set temperature is achieved, the stir feature is cancelled and can only be reinstated upon entry into melt. The operator is required to press a key on the computer to cancel this alarm prior to stirring.

Referring now more particularly to FIG. 11, FIG. 11 is a flow-chart for a stir program based on dual probe temperature control, and automatic cancellation of stir display and alarm. The stir program 100 is coupled to the microprocessor portions 56, 57, 62, 58, 59, 60, 61, 71, 72, 73 and 74 which may be the same as the corresponding microprocessor portions of the FIG. 7 apparatus and, accordingly, will not be further described. The microprocessor portion 62 determines whether the stir temperature Tn has been reached previously. If so, the stir alarm is not sounded. This prevents constantly harassing an operator if the temperature drops during stir to a previous stir temperature. If the stir temperature has not been reached previously, the programmed temperature differential Dt is compared to the measured temperature differential. If the measured temperature differential exceeds the programmed differential the "yes" output of the "is temperature differential greater than Dt?" microprocessor portion 96 initializes the stir display and alarm and starts the timer $t_s$. When the set temperature is achieved, the stir feature is canceled and can only be reinstated upon entry into melt. The alarm and display will automatically cancel at the alarm timer expiration. The operator has been alerted that a stir time has been reached.

The "no" output of the "is the temperature differential greater than Dt?" microprocessor 96 is coupled to the "decrement n" microprocessor portion 58.

Referring now more particularly to FIG. 12, FIG. 12 represents a flow-chart for a stir program based on dual probe temperature control, and automatic cancellation of display and alarm if a temperature differential decrease is detected or a timer expires. The stir program 110 is coupled to microprocessor portions 56, 57, 62, 58, 59, 60, 61, 71, 72, 73 and 74 which may be the same as the corresponding microprocessor portions of the FIG. 8 apparatus and, accordingly, will not be further described. Microprocessor portion 57 compares the present temperature to the predetermined stir temperatures Tn. If a stir temperature is detected, the "yes" output of the microprocessor portion 57 is coupled to the microprocessor portion 62 to determine if the temperature Tn has been reached previously. If the temperature has been reached previously, the stir alarm is not sounded. This prevents constantly harassing an operator if the temperature drops during stir to a previous stir temperature. The "yes" output of the microprocessor portion 62 is then applied to the microprocessor portion 58. If the stir temperature has not been reached previously the programmed temperature differential Dt is compared to the measured temperature differential. For this purpose a "no" output of the microprocessor portion 62 is coupled to an "is temperature differential greater than Dt?" microprocessor portion 96. The "no" output of the microprocessor portion 96 is coupled to the "decrement n" microprocessor portion 58. If the measured differential exceeds the programmed differential Dt, the "yes" output of the microprocessor portion 96 causes the initialization of the stir display and alarm and the start of timer $t_s$ by microprocessor portion 71. The stir display and alarm then are activated. An "is temperature differential less than Dts?" microprocessor portion 111 provides a "yes" output coupled to a "cancel stir alarm and display initialize temperature Tn microprocessor portion 74 if the dual probe temperature differential is less than a specified temperature differential Dts which is the programmed temperature differential, prior to the alarm expiration. If a sufficient temperature differential decrease is not detected, the alarm timer expiration will cancel the alarm. Vigorously stirring the shortening for several seconds will cause a temperature differential decrease that can be used to override the automatic cancellation by the timer ts.

When the set temperature is reached, the stir feature preferably is canceled by the microprocessor portion 60 and can only be reinstated upon entry into melt.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus for prompting an operator to stir a cooking medium in a cooking appliance, comprising:

means for determining whether the temperature of a cooking medium is below a predetermined value below which it is desired to prompt an operator to stir the cooking medium;

register means responsive to said temperature-determining means when the temperature of the cooking medium is below said predetermined value for determining the number of times stirring is to be performed;

timer means responsive to said temperature-determining means for determining a predetermined time interval between stir prompt signals to be initialized;

means responsive to said register means for determining whether the number of times stirring is to be performed equals zero;

decrementing means responsive to said timer means for decrementing said register means when said timer means has timed said predetermined time interval and stirring is to be performed;

means responsive to said decrementing means for initializing a stir prompt signal to an operator to stir the cooking medium;

means responsive to said initializing means for rendering a stir prompt signal;

means for initializing a cancellation of the stir prompt signal when actuated;

means responsive to said cancellation-initializing means for determining whether said cancellation-initializing means has been actuated; and means responsive to the actuation of said cancellation-initializing means for canceling the stir prompt signal.

2. Apparatus in accordance with claim 1 in which said decrementing means decrements said register means when said timer means reaches zero.

3. Apparatus for prompting an operator to stir a cooking medium in a cooking appliance, comprising:

means for determining whether the temperature of a cooking medium is below a predetermined value below which it is desired to prompt an operator to stir the cooking medium;

register means responsive to said temperature-determining means when the temperature of the cooking medium is below said predetermined value for determining the number of times stirring is to be performed;

first timer means responsive to said temperature-determining means for determining a predetermined time interval between stir prompt signals to be initialized;

means responsive to said register means for determining whether the number of times stirring is to be performed equals zero;

decrementing means responsive to said first timer means for decrementing said register means when said timer means has timed said predetermined time interval and stirring is to be performed;

second timer means;

means responsive to said decrementing means for initializing a stir prompt signal to an operator to stir the cooking medium and for starting said second timer means; and means responsive to said second timer means after a second predetermined time interval for canceling the stir prompt signal.

4. Apparatus in accordance with claim 3 in which said decrementing means responsive to said first timer means is responsive thereto when the number of times stirring is to be performed is not equal to zero.

5. Apparatus in accordance with claim 3 which includes means responsive to said initializing means for rendering a stir prompt signal before the elapse of a second predetermined time interval.

6. Apparatus in accordance with claim 3 in which said means responsive to said second timer means cancels the stir prompt signal when said second timer means reaches zero.

7. Apparatus in accordance with claim 3, which includes means responsive to said second timer means for determining whether the temperature of the cooking medium has decreased by a predetermined amount and in which said means responsive to said second timer means is responsive to either said second timer means after said second predetermined time interval or to said temperature-determining means when said temperature has decreased by said predetermined amount for canceling the stir prompt signal.

8. Apparatus for prompting an operator to stir a cooking medium in a cooking appliance, comprising:

means for determining whether the temperature of a cooking medium is below a predetermined value below which it is desired to prompt an operator to stir the cooking medium;

register means for storing a number of selected values of stir prompt temperatures;

means responsive to said temperature-determining means for selecting a first stir prompt temperature from said register means;

means for determining the present temperature of the cooking medium;

means responsive to the present temperature of the cooking medium for determining whether the present temperature equals the selected first stir prompt temperature;

means responsive to said equal-temperature determining means for decrementing the number of selected stir prompt temperature values of said register means if the present temperature does not equal the selected first stir prompt temperature;

means responsive to sad decrementing means for determining whether the number of selected temperature values remaining after each decrementing is zero; and means responsive to a remaining number other than zero of selected temperature values for selecting a second stir prompt temperature from said register means.

9. Apparatus in accordance with claim 8 which includes means responsive to a remaining number equal to zero of selected temperature values for determining whether a set temperature has been reached and for selecting a stir prompt temperature from said register means if said set temperature has not been reached.

10. Apparatus for prompting an operator to stir a cooking medium in a cooking appliance, comprising:

means for determining whether the temperature of a cooking medium is below a first predetermined value below which it is desired to prompt an operator to stir the cooking medium:

register means for storing a number of selected values of stir prompt temperatures;

means responsive to said temperature-determining means for selecting a first stir prompt temperature from said register means;

means for determining the present temperature of the cooking medium;

means responsive to the present temperature of the cooking medium for determining whether the present temperature equals the selected first stir prompt temperature;

means responsive to said equal-temperature determining means for determining whether the present temperature has been reached previously if the present temperature equals the selected first stir prompt temperature;

means responsive to said present temperature having been reached previously for decrementing the number of selected stir prompt temperature values of said register means;

means responsive to said decrementing means for determining whether the number of selected temperature values remaining after each decrementing is zero; and means responsive to a remaining number other than zero of selected temperature values for selecting a second stir prompt temperature from said register means.

11. Apparatus in accordance with claim 10 which includes:
means responsive to said present temperature not having been reached previously for initializing a stir prompt signal to an operator to stir the cooking medium;
means responsive to said initializing means for rendering a stir prompt signal;
means for initializing a cancellation of the stir prompt signal when actuated;
means responsive to said cancellation-initializing means for determining whether said cancellation-initializing means has been actuated;
means responsive to the actuation of said cancellation-initializing means for canceling the stir prompt signal and for selecting said second stir prompt temperature.

12. Apparatus in accordance with claim 10 which includes:
timer means;
means responsive to the present temperature when the present temperature has not been reached previously for initializing a stir prompt signal and for starting said timer means;
means responsive to said initializing means for rendering a stir prompt signal; and
means responsive to said timer means after a predetermined time interval for canceling the stir prompt signal.

13. Apparatus in accordance with claim 12 in which said signal-canceling means cancels the stir prompt signal when the timer means reaches zero.

14. Apparatus in accordance with claim 10 which includes:
timer means;
means responsive to the present temperature when the present temperature has not been reached previously for initializing a stir prompt signal and for starting said timer means;
means responsive to said initializing means for rendering a stir prompt signal;
means responsive to said timer means for determining whether the temperature of the cooking medium has decreased by a predetermined amount; and
means responsive to either said timer means after a predetermined time interval or to said temperature-determining means when said temperature has decreased by said predetermined amount for canceling the stir prompt signal.

15. Apparatus in accordance with claim 10 which includes:
means for determining whether the temperature differential of a cooking medium at different locations in the cooking medium is greater than a second predetermined value above which it is desired to prompt an operator to stir the cooking medium;
means responsive to said temperature differential being greater than said second predetermined value for initializing a stir prompt signal to an operator to stir the cooking medium;
means responsive to said initializing means for rendering a stir prompt signal;
means for initializing a cancellation of the stir prompt signal when actuated;
means responsive to said cancellation-initializing means for determining whether said cancellation-initializing means has been actuated;
means responsive to the actuation of said cancellation-initializing means for canceling the stir prompt signal and for selecting said second stir prompt temperature.

16. Apparatus in accordance with claim 10 which includes means for determining whether the temperature differential of a cooking medium at different locations in the cooking medium is greater than a predetermined value above which it is desired to prompt an operator to stir the cooking medium;
timer means;
means responsive to said temperature differential being greater than said predetermined value for initializing a stir prompt signal to an operator to stir the cooking medium and for starting said timer means;
means responsive to said initializing means for rendering a stir prompt signal; and
means responsive to said timer means after a predetermined time interval for canceling the stir prompt signal.

17. Apparatus in accordance with claim 10 which includes means for determining whether the temperature differential of a cooking medium at different locations in the cooking medium is greater than a predetermined value above which it is desired to prompt an operator to stir the cooking medium;
timer means;
means responsive to said temperature differential being greater than said predetermined value for initializing a stir prompt signal to an operator to stir the cooking medium and for starting said timer means;
means responsive to said initializing means for rendering a stir prompt signal;
means responsive to said stir-prompt-signal-rendering means for determining whether the temperature differential of the cooking medium at different locations in the cooking medium is less than a predetermined value at or above which it is desired to prompt an operator to stir the cooking medium; and
means responsive to either said timer means after a predetermined time interval or to said temperature-differential-determining means when said temperature differential is less than a predetermined value for canceling the stir prompt signal.

18. Apparatus in accordance with claim 17 in which said means for determining whether said temperature differential of said cooking medium is less than a predetermined value is responsive to said means for determining whether said predetermined temperature has been reached previously when said predetermined temperature has not been reached previously for decrementing the number of selected stir prompt values of said register means.

19. Apparatus for prompting an operator to stir a cooking medium in a cooking appliance, comprising:
means for determining whether the temperature of a cooking medium is below a first predetermined value below which it is desired to prompt an operator to stir the cooking medium;
register means responsive to said temperature-determining means when the temperature of the cooking medium is below said predetermined value for determining the number of times stirring is to be performed;

first timer means responsive to said temperature-determining means for determining a predetermined time interval between stir prompt signals to be initialized;

means responsive to said register means for determining whether the number of times stirring is to be performed equals zero;

decrementing means responsive to said first timer means for decrementing said register means when said timer means has timed said predetermined time interval and stirring is to be performed;

second timer means;

means responsive to said decrementing means for initializing a stir prompt signal to an operator to stir the cooking medium and for starting said second timer means;

means responsive to said initializing means for rendering a stir prompt signal;

means for determining the temperature differential of the cooking medium at different locations in the cooking medium;

means responsive to said temperature-differential-determining means and to said second timer means for determining whether the temperature differential of the cooking medium at different locations in the cooking medium is less than a second predetermined value at or above which it is desired to prompt an operator to stir the cooking medium; and means responsive to either said second timer means after a second predetermined time interval or to said temperature-differential-determining means when said temperature differential is less than said predetermined value for canceling the stir prompt signal.

* * * * *